UNITED STATES PATENT OFFICE.

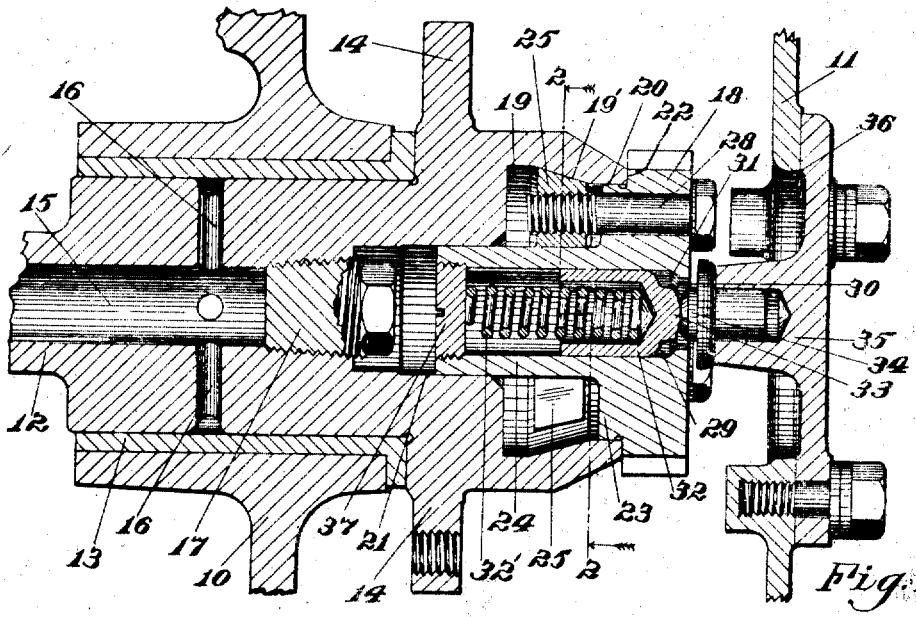
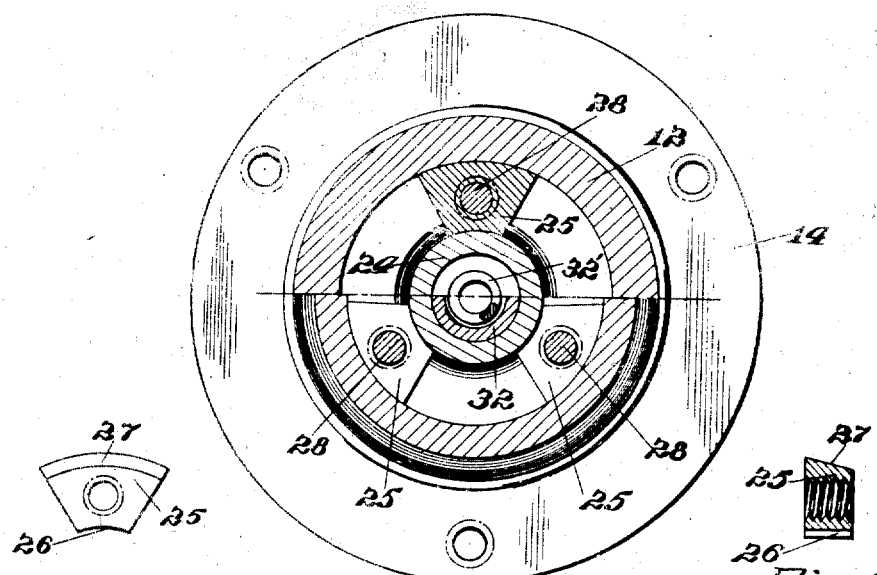

GEORGE L. McCAIN, OF DETROIT, MICHIGAN, ASSIGNOR TO PACKARD MOTOR CAR COMPANY, OF DETROIT, MICHIGAN, A CORPORATION OF MICHIGAN.

COUPLING.

1,251,065.　　　　Specification of Letters Patent.　　Patented Dec. 25, 1917.

Application filed June 14, 1915.　Serial No. 34,022.

*To all whom it may concern:*

Be it known that I, GEORGE L. MCCAIN, a citizen of the United States, and resident of Detroit, Wayne county, State of Michigan, have invented certain new and useful Improvements in Couplings, of which the following is a specification.

This invention relates to couplings and particularly to shaft couplings permitting angular adjustment of one shaft or shaft section relative to another.

The invention finds application to a variety of uses and is therefore not limited to the exact form shown in this application, it being understood that this form is illustrative only and various modifications may be made without departing from the scope of the invention.

One of the objects of the invention is to provide a coupling between two shaft members or sections that will permit of easy loosening, a setting of the members axially, that is, rotating one of them slightly relatively to the other, and a quick and secure retightening.

Further objects are simplicity and cheapness for manufacturing and a design permitting extreme accuracy of connections.

Other objects will appear from the following description, taken in connection with the drawings which form a part of this specification, and in which:—

Figure 1 is a longitudinal sectional view through a coupling embodying this invention;

Fig. 2 is a transverse section approximately on the line 2—2 of Fig. 1; and

Figs. 3 and 4 are detail views of the wedge nut.

In the drawings the invention is shown as applied to the cam shaft of a hydrocarbon motor and a portion of the crank case or support for the shaft is shown at 10. A fragment of the front cover of the crank case is also shown at 11 and it will be understood that this cover is preferably detachable but when secured in place it forms a part of the support or crank case 10.

The cam shaft 12 is shown as mounted in a suitable supporting bearing 13, and is preferably formed with a flange 14 to which a suitable gear (not shown) may be attached for driving the shaft. The cam shaft 12 is shown as bored out at 15 so that oil may be supplied to the shaft under pressure and fed to the bearings 13 through cross channels 16. A plug 17 closes the forward end of the bore 15.

For the purpose of driving a suitable ignition distributer from the cam shaft 12, a member 18 shown in the form of a spiral gear is adapted to be coupled to the forward end of said shaft in such manner that it may be adjusted angularly relatively to the shaft for the purpose of advancing or retarding the ignition mechanism relatively to the crank shaft of the motor. For the purposes of this invention therefore the shaft 12 and the member 18 are the two members that are to be coupled and may be considered as separate shaft members or sections, either of which may constitute the driving member.

The member 12 is shown as enlarged at its forward end and formed with a socket 19 which is of comparatively large diameter and cylindrical in form adjacent the orifice, as at 20. Inwardly from this cylindrical surface 20, the interior wall 19' of the socket 19 is conical in shape, enlarging as it extends inwardly for some distance. Then at its base the socket 19 is much smaller in diameter as at 21, this latter portion of the socket extending into the bore 15 of the cam shaft but not communicating therewith because of the insertion of the plug 17 hereinabove referred to.

The member 18 is formed with a shoulder 22 which is adapted to accurately fit the extreme end of the member 12, and with a cylindrical part 23 which fits within the socket member in the zone of the cylindrical surface 20, this nicely centering the member 18 relatively to the member 12. The member 18 is also formed with an extension 24 which may be termed a pilot and which enters the contracted portion 21 of the socket 19.

It will be seen that when the member 18 is in place in the socket 19, as shown in Fig. 1, there is a considerable annular space left between the extension 24 of the member 18 and the conical wall 19' of the socket. In this space are arranged a series of nuts 25 which are shown in all of the figures and particularly in detail in Figs. 3 and 4. The surface 26 of each of these nuts fits and slides upon the outer cylindrical surface of the extension 24, and the surface 27 conforms to the conical surface 19' of the interior wall of the socket 19. Thus the nuts are in the form of a wedge sliding on the cylindrical surface of the extension 24, and means are provided for tightening them between said extension and the conical surface 19'. Said means as shown comprises a bolt 28 for each of the nuts extending parallel to the axis of the shaft and, as shown, through the gear part of the member 18. These bolts 28 are threaded into the nuts 25 and the nuts are drawn forwardly by turning the bolt as will be clearly understood. Any desired number of nuts and bolts may be used, three being shown in the drawings.

The member 18 is provided with a spring pressed thrust bolt which is adapted to resist the thrust on the shaft due to the pressure of oil supplied to the interior of the cam shaft for lubrication purposes, as above described. For this purpose the member 18 is drilled out as at 29, this bore however being slightly contracted as at 30 forming a shoulder 31 against which the thrust bolt 32 may abut. The head 33 of the thrust bolt however may extend through the smaller opening 30 for contact with the wearing piece 34 set in a cap 35 which closes the opening 36 formed in the cover 11 opposite the gear member 18. It will be understood that the thrust bolt 32 is assembled in the member 18 before the latter is coupled to the member 12 and a spring 32 is placed behind the bolt 32 and a plug 37 closes the rear opening.

The cap 35 above referred to may be readily removed for permitting adjustment of the member 18 relatively to the member 12. This adjustment is obtained by slightly loosening the three bolts 28, turning the member 18 relatively to the member 12 the desired amount and then retightening the bolts 28.

The coupling is assembled by first placing the three wedge nuts 25 in the socket 19, then inserting the member 18 with its pilot 24 in the inner part 21 of the socket 19, and then inserting the bolts 28 through the gear part of the member 18 and into the respective nuts and tightening these bolts so that the nuts are wedged between the cylindrical surface of the extension 24 and the conical wall 19' of the socket 19 of member 12.

Having thus described my invention, what I claim and desire to secure by Letters Patent is:—

1. A shaft coupling comprising a member having an annular socket in its end, a second member having a part centering it in the socket and a part smaller than and extending into the socket, and a wedge device arranged between the inner wall of said socket and the extended part of said second member.

2. A shaft coupling comprising two members to be coupled, one of said members having an end socket with inner walls having axially spaced bearing surfaces of different diameters, and the other of said members having parts adapted to fit said bearing surfaces respectively, and means in said socket for securing said members together.

3. A shaft coupling comprising two members to be coupled, one of said members having an end socket with inner walls having axially spaced bearing surfaces of different diameters, and the other of said members having parts adapted to fit said bearing surfaces respectively, and means arranged in said socket between the axially spaced surfaces for securing said members together.

4. A shaft coupling comprising two members to be coupled, one of said members having an end socket with inner walls having axially spaced bearing surfaces of different diameters, and the other of said members having parts adapted to fit said bearing surfaces respectively, and means in said socket for frictionally binding said members together.

5. A shaft coupling comprising two members to be coupled, one of said members having an end socket with inner walls having axially spaced bearing surfaces of different diameters, and the other of said members having parts adapted to fit said bearing surfaces respectively, and means arranged in said socket between the axially spaced surfaces for frictionally binding said members together.

6. A shaft coupling comprising two members to be coupled, one of said members having an end socket with inner walls having axially spaced bearing surfaces of different diameters, and tapering walls between said surfaces, and the other of said members having parts adapted to fit said bearing surfaces respectively, and means coöperating with said tapering walls for binding said members together.

7. A shaft coupling comprising two members to be coupled, one of said members being formed with an end socket having a conical tapering wall and the other of said members having a part extending into said socket, means for centering the parts relatively, and means arranged between said wall and said extended part for binding said members together.

8. A shaft coupling comprising two members to be coupled, one of said members being formed with an end socket having a cylindrical bearing surface, and a shoulder adjacent the orifice thereof and a tapering wall widening axially from said surface, and the other of said members having a part to fit said cylindrical surface and an extended part radially inward of said tapering wall, and a wedge device between said wall and said extended part for binding said members together.

9. A shaft coupling comprising two members to be coupled, one of said members being formed with an end socket having a cylindrical bearing surface and a shoulder adjacent the orifice thereof and a tapering wall widening axially from said surface, and the other of said members having a part to fit said cylindrical surface and an extended part radially inward of said tapering wall, a wedge nut arranged between said wall and said extended part, and a bolt extending axially through a part of one of said members for tightening said wedge nut in place.

10. A shaft coupling comprising a socket member having a conical interior wall, a second member having a shoulder abutting the end of the socket member and having a cylindrical part centered within the socket member, nuts having surfaces to fit said conical wall and cylindrical part respectively, and bolts in one of said members for tightening said nuts between said wall and part.

11. The combination with a support having a shaft bearing, of a shaft in said bearing formed with a socket at one end, said support having a part arranged axially in line with and adjacent said end of the shaft, a member adapted to be secured within and removed axially from said socket, and a spring thrust bolt arranged in said member and adapted to contact with said axially arranged support part.

12. A shaft coupling comprising a member having an end socket, a gear member having a part extending into said socket, said members having relatively centering means, means for securing the members together, and a thrust bolt arranged in said gear member and operating in the extended part thereof.

13. A shaft coupling comprising a member having an end socket, a gear member having a part extending into said socket, said members having relatively centering means, wedge nuts arranged between the interior wall of the socket and said extended part of the gear member, and bolts passing through the gear into the nuts for producing the wedging action.

In testimony whereof I affix my signature in the presence of two witnesses.

GEORGE L. McCAIN.

Witnesses:
LE ROI J. WILLIAMS,
CLAIR S. COTE.